United States Patent
Cai et al.

(10) Patent No.: US 11,549,672 B2
(45) Date of Patent: Jan. 10, 2023

(54) ONBOARD CONTROLLER FOR LIGHT FIXTURE FOR INDOOR GROW APPLICATION

(71) Applicant: HGCI, Inc., Las Vegas, NV (US)

(72) Inventors: Dengke Cai, Camas, WA (US); Mark A. Ochs, Kelowna (CA)

(73) Assignee: HGCI, Inc., Las Vegas, NV (US)

( * ) Notice: Subject to any disclaimer, the term of this patent is extended or adjusted under 35 U.S.C. 154(b) by 0 days.

(21) Appl. No.: 17/536,651

(22) Filed: Nov. 29, 2021

(65) Prior Publication Data
US 2022/0170617 A1 Jun. 2, 2022

Related U.S. Application Data

(60) Provisional application No. 63/118,984, filed on Nov. 30, 2020.

(51) Int. Cl.
| | |
|---|---|
| *H05B 45/385* | (2020.01) |
| *F21V 23/00* | (2015.01) |
| *H05B 47/175* | (2020.01) |
| *H05B 45/18* | (2020.01) |

(Continued)

(52) U.S. Cl.
CPC ........... *F21V 23/003* (2013.01); *H05B 45/18* (2020.01); *H05B 45/385* (2020.01); *H05B 47/175* (2020.01); *A01G 7/045* (2013.01); *F21Y 2115/10* (2016.08)

(58) Field of Classification Search
CPC ... A01G 7/045; F21V 23/003; F21Y 2115/10; H05B 45/18; H05B 45/385; H05B 47/175
See application file for complete search history.

(56) References Cited

U.S. PATENT DOCUMENTS

| | | | |
|---|---|---|---|
| 7,202,613 B2* | 4/2007 | Morgan ................. | H05B 45/20 315/312 |
| 8,742,686 B2* | 6/2014 | Zampini, II .......... | H05B 45/00 315/297 |
| 9,188,307 B2* | 11/2015 | Casper .................... | F21V 23/02 |

(Continued)

OTHER PUBLICATIONS

Rodriquez, Kari; International Search Report and Written Opinion of the International Searching Authority issued in International Application No. PCT/US2021/060472; dated Feb. 14, 2022; 12 pages.

*Primary Examiner* — Kurtis R Bahr
(74) *Attorney, Agent, or Firm* — Ulmer & Berne LLP

(57) ABSTRACT

A light fixture includes a communication input and output, a plurality of LED lights, an LED driver, first and second control modules, and a feedback circuit. The communication input is configured to receive a control signal. The communication output is configured to relay the control signal to a downstream light fixture. The LED driver is electrically coupled with the plurality of LED lights. The first control module is in signal communication with the communication input and output and the LED driver and is configured to transmit a driver signal to the LED driver that controls operation of the plurality of LED lights. The second control module is in signal communication with the first control module. The feedback circuit is in signal communication with the second control module and the LED driver. The LED driver transmits a feedback signal to the second control module via the feedback circuit.

19 Claims, 5 Drawing Sheets

(51) Int. Cl.
*A01G 7/04* (2006.01)
*F21Y 115/10* (2016.01)

(56) References Cited

U.S. PATENT DOCUMENTS

| | | | |
|---|---|---|---|
| 2015/0061511 A1* | 3/2015 | Chemel | H05B 47/155 |
| | | | 315/153 |
| 2017/0034895 A1* | 2/2017 | Vogel | A01G 7/045 |
| 2018/0332777 A1 | 11/2018 | Thosteson et al. | |
| 2019/0320511 A1 | 10/2019 | Aikala | |
| 2020/0359482 A1* | 11/2020 | Cai | H05B 45/385 |

* cited by examiner

ONBOARD CONTROLLER FOR LIGHT FIXTURE FOR INDOOR GROW APPLICATION

REFERENCE TO RELATED APPLICATION

This application claims priority of U.S. provisional patent application Ser. No. 63/118,984, entitled Onboard Controller for Light Fixture for Indoor Grow Application, filed Nov. 30, 2020, and hereby incorporates this provisional patent application by reference herein in its entirety.

TECHNICAL FIELD

The apparatus described below generally relates to a light fixture that includes an illuminating source for illuminating an indoor grow facility. The light fixture includes an onboard controller that facilitates operation of the illumination source.

BACKGROUND

Indoor grow facilities, such as greenhouses, include light fixtures that provide artificial lighting to plants for encouraging growth. Each of these light fixtures typically includes an LED light source that generates the artificial light for the plants and a controller that controls operation of the LED light source.

BRIEF DESCRIPTION OF THE DRAWINGS

Various embodiments will become better understood with regard to the following description, appended claims and accompanying drawings wherein:

DETAILED DESCRIPTION

Figure 1:
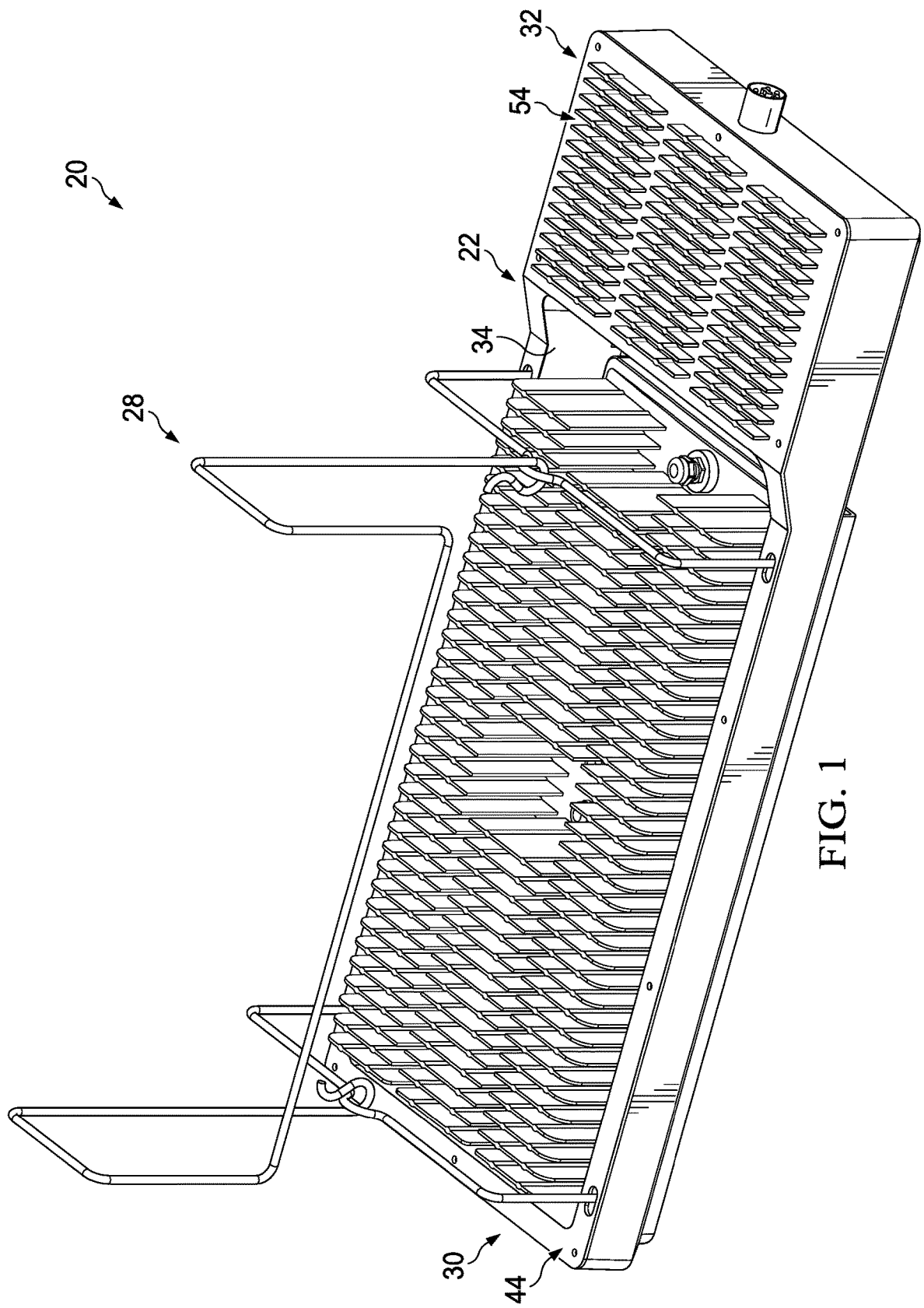
FIG. 1 is an upper isometric view depicting a light fixture, in accordance with one embodiment.
Figure 2:
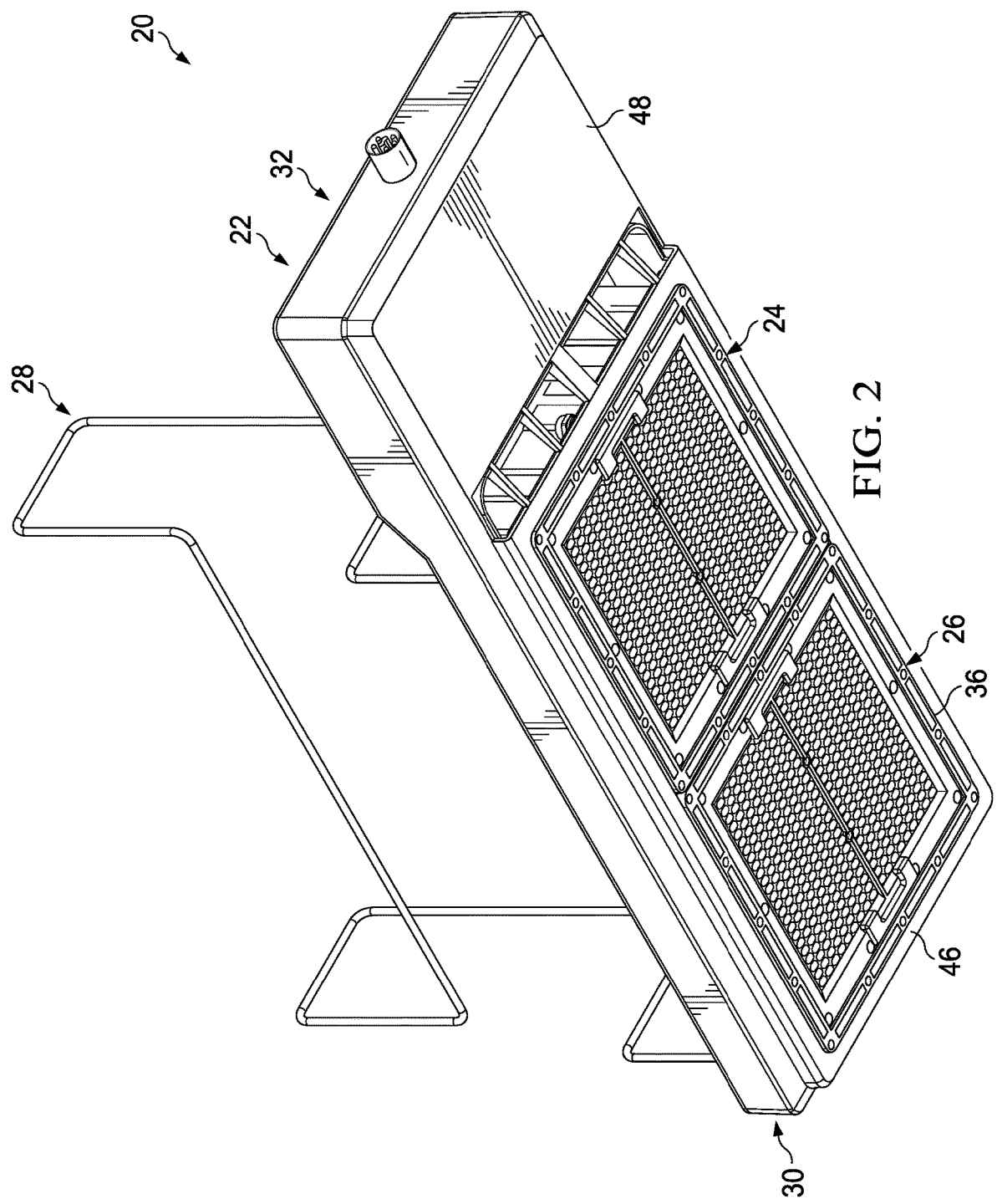
FIG. 2 is a lower isometric view of the light fixture of FIG. 1.

Embodiments are hereinafter described in detail in connection with the views and examples of FIGS. 1-5, wherein like numbers indicate the same or corresponding elements throughout the views. A light fixture 20 for an indoor grow facility (e.g., a greenhouse) is generally depicted in FIGS. 1 and 2 and can include a housing 22, first and second lighting modules 24, 26 (FIG. 2), and a hanger assembly 28. The housing 22 can include a light support portion 30 and a controller support portion 32 adjacent to the light support portion 30. The light support portion 30 can define a lighting receptacle 34 (FIG. 1) and a window 36 (FIG. 2) disposed beneath the lighting receptacle 34. The first and second lighting modules 24, 26 (FIG. 2) can be disposed within the lighting receptacle 34 above the window 36 and can be configured to emit light through the window 36, as will be described in further detail below.

Figure 3:
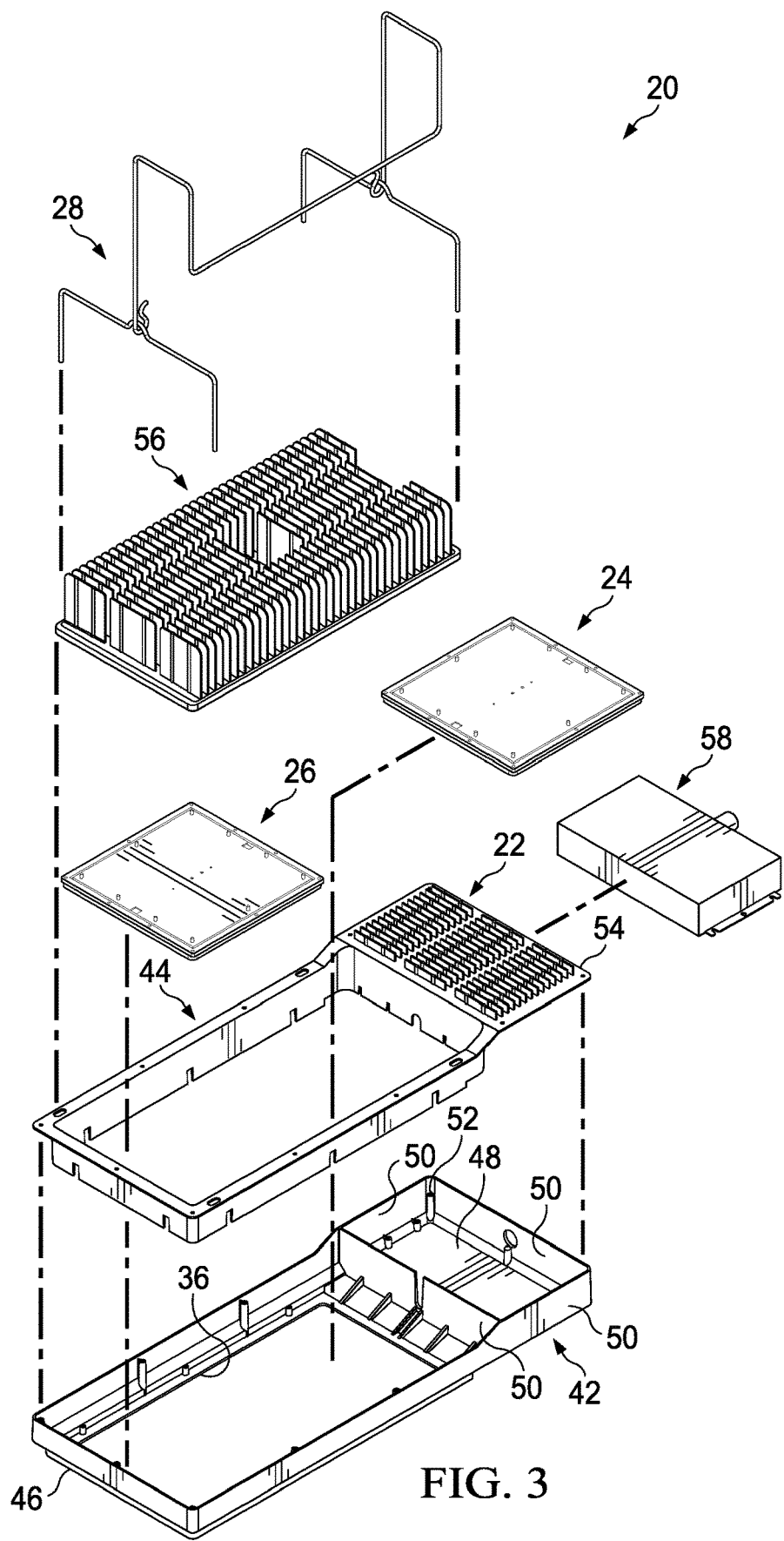
FIG. 3 is a partially exploded upper isometric view of the LED light fixture of FIG. 1.

The hanger assembly 28 can facilitate suspension of the light fixture 20 above one or more plants (not shown) such that light emitted through the window 36 from the first and second lighting modules 24, 26 can be delivered to the underlying plant(s) to stimulate growth. Referring now to FIG. 3, the housing 22 can include a main frame 42 and a cover member 44 that overlies the main frame 42 and is coupled together with the main frame 42 via welding, adhesives, releasable tabs (not shown), fasteners (not shown), or any of a variety of suitable alternative permanent or releasable fastening arrangements. The main frame 42 can include a bottom lighting wall 46 that defines the window 36. The main frame 42 can include a bottom controller wall 48, and a plurality of sidewalls 50 that cooperate to define a controller receptacle 52. The cover member 44 can include a lid portion 54 that overlies and covers the controller receptacle 52, as illustrated in FIG. 1. The bottom controller wall 48, the sidewalls 50, and the lid portion 54 can form at least part of the controller support portion 32 of the housing 22.

The first and second lighting modules 24, 26 can each include a plurality of light emitting diodes (LEDs) (not shown). The LEDs can comprise single color LEDs (e.g., capable of emitting only one color of light such as white, red or blue), multi-color LEDs (e.g., capable of emitting different colors such as white, red, and blue) or a combination of both.

Referring now to FIGS. 1 and 3, a heat sink 56 can be disposed over each of the first and second lighting modules 24, 26 and can be configured to dissipate heat away from the first and second lighting modules 24, 26. The heat sink 56 can be formed of any of a variety of a thermally conductive materials, such as aluminum or copper, for example. As illustrated in FIG. 3, an onboard controller 58 (hereinafter "the controller 58") can be disposed in the controller receptacle 52 and can be configured to power and control the first and second lighting modules 24, 26, as will be described in further detail below. As illustrated in FIG. 1, the lid portion 54 of the cover member 44 can overlie the controller receptacle 52 and the controller 58. The lid portion 54 can serve as a heat sink for the controller 58.

Figure 4:
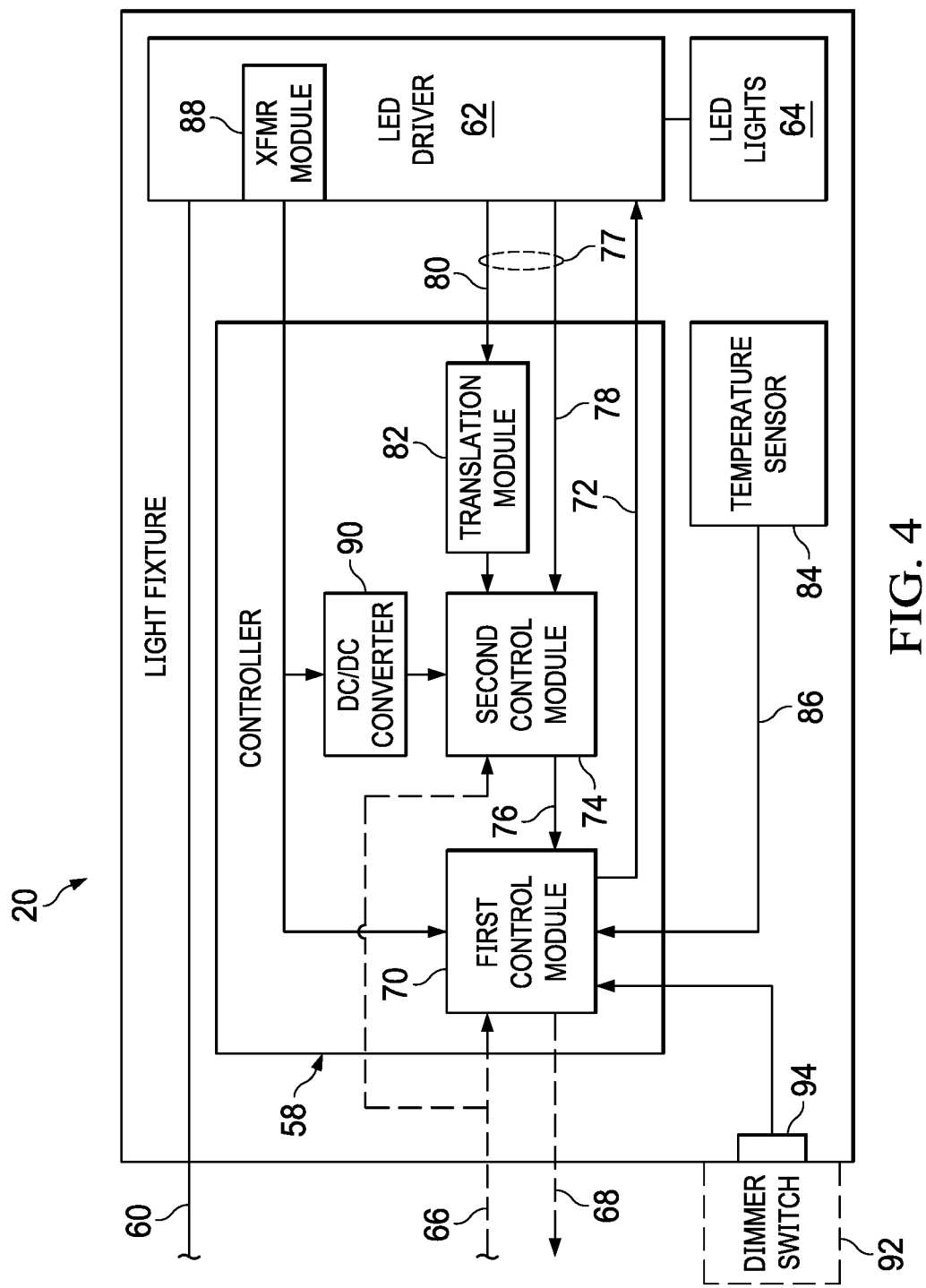
FIG. 4 is a schematic view of various components of the light fixture of FIG. 1.

Referring now to FIG. 4, a schematic view of the light fixture 20 is illustrated and will now be described. The light fixture 20 can include a power input 60. A power source, such as a 12 VDC power source, can be electrically coupled with the power input 60 by an input power cable (not shown). The light fixture 20 can include an LED driver 62 and a plurality of LED lights 64 electrically coupled with the LED driver 62. The LED driver 62 can be configured to facilitate the operation (e.g., dimming/intensity) of the LED lights 64. The power input 60 can be electrically coupled with the LED driver 62 to facilitate powering of the LED lights 64. In one embodiment, the light fixture 20 can be configured to operate at an input power of between about 85 VAC and about 347 VAC (e.g., a 750 Watt to 1,000 Watt load capacity).

The light fixture 20 can also include a communication input 66 and a communication output 68. The communication input 66 can be in signal communication (e.g., communicatively coupled) with a remote controller (not shown) (e.g., an automated greenhouse controller) that can transmit a control signal to the light fixture 20 that facilitates control of the dimming of the LED lights 64. The communication output 68 can be in signal communication with another light fixture (e.g., a downstream light fixture) (not shown) and can be configured to relay the control signal from the remote controller to the downstream light fixtures.

The controller 58 can include a first control module 70 that is in signal communication with the communication input 66 and the communication output 68 and facilitates communication with the remote controller and a downstream controller. In one embodiment, the first control module 70 can be configured to communicate digitally (e.g., via RS-485, ModBus, BacNET, CamNET, or ASCII) with the remote controller and the downstream light fixtures. In such an embodiment, the first control module 70 can be configured to both receive data from the remote controller (e.g., the control signal) and also transmit status data to the remote controller. The status data that is transmitted from the first control module 70 to the remote controller can include any of a variety of suitable information about the light fixture 20 such as, for example, IP address, operational status, current temperature, failed components, or current power consumption. In one embodiment, the communication input 66 and the communication output 68 can be in signal communication with the remote controller and the downstream light fixture via respective communication cables, such as, for example, a CAT 6e cable, that facilitates bidirectional communication among the remote controller and the light fixtures. It is to be appreciated that although the control signal is described as controlling the dimming of the LED lights 64, the control signal can additionally or alternatively facilitate control any of a variety of other suitable operating characteristics of the light fixture 20 (e.g., scheduling and/or color mixing) according to the principles and details described above.

The first control module 70 can also be in signal communication with the LED driver 62 via a signal line 72. The first control module 70 can be configured to receive the control signal from the remote controller and generate a driver signal that is transmitted to the LED driver 62 for controlling the intensity of the LED lights 64 according to the intensity requested by the control signal. In one embodiment, the first control module 70 can be configured to translate the driver signal from the control signal to be compatible with the signal requirements of the LED driver 62. It is to be appreciated that the first control module 70 can be a microcontroller, a system on a chip (SoC), a processor, or any of a variety of other suitable computing or communication devices.

The controller 58 can also include a second control module 74 that is in signal communication with the first control module 70 via a signal line 76. The LED driver 62 can be in signal communication with the second control module 74 via a power feedback circuit 77 and can provide a power consumption feedback signal that indicates the current power consumption of the LED lights 64 (e.g., in real time). The second control module 74 can monitor the power consumption of the LED lights 64 via the power consumption feedback signal. As will be described in more detail below, when the power consumption of the LED lights 64 is abnormal (e.g., a fault condition has occurred), the second control module 74 can be configured to send instructions via an override signal on the signal line 76 in response to the power consumption feedback signal to correct the fault condition. In response, the first control module 70 can ignore the instructions from the control signal and can instead operate the LED lights 64 according to the instructions provided by the override signal. In one embodiment, the first control module 70 can send a message to the remote controller that indicates that a fault condition has occurred and the remote controller can generate an alarm that notifies a user of the fault condition. In one embodiment, the translation module can comprise a Hall Effect diode. It is to be appreciated that the second control module 74 can be a microcontroller, a system on a chip (SoC), a processor, or any of a variety of other suitable computing or communication devices.

Still referring to FIG. 4, the power feedback circuit 77 can include a voltage feedback line 78 and a current feedback line 80. During operation of the light fixture 20, the voltage feedback line 78 and the current feedback line 80 can cooperate to indicate the current power consumption of the LED lights 64. In particular, the LED driver 62 can transmit a voltage feedback signal to the second control module 74 (as voltage data via the voltage feedback line 78) that indicates the current operating voltage (e.g., in real time) of the LED lights 64. The LED driver 62 can also transmit a current feedback signal to the second control module 74 (as current data via the current feedback line 80) that indicates the current operating current (e.g., in real time) of the LED lights 64. The current feedback signal can be routed through a translation module 82 that facilitates translation of the current feedback signal into a suitable format for the second control module 74.

The second control module 74 can be in signal communication with the communication input 66 such that the control signal is transmitted to the second control module 74. The second control module 74 can be configured to determine whether an abnormality has occurred with the LED lights 64 as a function of the intensity requested by the control signal. In one embodiment, the second control module 74 can be configured to calculate a threshold power consumption value for the LED lights 64 as a function of the intensity requested by the control signal. The threshold power consumption value can be understood to be the power level at which the LED lights 64 are prone to failure (e.g., due to overheating) and can be a predetermined value that is preset (e.g., during manufacturing or by a user during programming of the light fixture) or calculated dynamically (e.g., in real time) during operation of the light fixture according to a predefined algorithm. In one embodiment, the threshold power consumption value can be about 105% of the rated power consumption for the LED lights 64 as a function of the light intensity that is requested by the control signal.

During operation of the light fixture 20, the second control module 74 can determine the current power consumption of the LED lights 64 from the voltage and current data provided by the voltage feedback signal and the current feedback signal, respectively, and can compare the current power consumption of the LED lights 64 to the threshold power consumption value. When the current power consumption of the LED lights is under the threshold power consumption value, the first control module 70 can control the LED lights 64 according to the control signal and can ignore any instructions provided from the override signal. When the current power consumption of the LED lights 64 is above the threshold power consumption value, the first control module 70 can override (i.e., ignore) the intensity requested by the control signal and can instead control the LED lights 64 according to the override signal. The override signal can include instructions that reduce the intensity of the LED lights 64 in such a way to bring the current power consumption of the LED lights 64 under the threshold power consumption value. As such, the second control module 74 can cooperate with the first control module 70 to facilitate continuous adjustment of the driver signal to maintain the operation of the LED lights 64 beneath the threshold power consumption value. If the LED lights 64 are unable to be operated beneath the threshold power consumption value (e.g., due to an internal fault or component failure), an alarm can be generated that notifies a user that a failure condition has occurred and the light fixture 20 can be shut down. It is to be appreciated that, although the threshold power consumption value is described as being calculated onboard the second control module 74, the threshold power consumption value can alternatively be calculated by a remote source, such as the first control module 70 or the remote controller, and transmitted to the second control module 74 for comparison with the current power consumption of the LED lights 64.

In another embodiment, the second control module 74 can be configured to calculate a target power consumption range for the LED lights 64 as a function of the intensity requested by the control signal. The target power consumption range can be a predefined range that is preset (e.g., during manufacturing or by a user during programming of the light fixture) or calculated dynamically (e.g., in real time) during operation of the light fixture according to a predefined algorithm, and can be understood to be the optimal range for encouraging plant growth. In one embodiment, the target power consumption range can be between about 95% and about 105% of the rated power consumption for the LED lights 64 as a function of the light intensity that is requested by the control signal.

During operation of the light fixture 20, the second control module 74 can determine the current power consumption of the LED lights 64 from the voltage and current data provided by the voltage feedback signal and the current feedback signal, respectively, and can compare the current power consumption of the LED lights 64 to the target power consumption range. When the current power consumption of the LED lights is within the target power consumption range, the first control module 70 can control the LED lights 64 according to the control signal and can ignore any instructions provided from the override signal. When the current power consumption of the LED lights 64 is outside of the target power consumption range, the first control module 70 can override (i.e., ignore) the intensity requested by the control signal and can instead control the LED lights 64 according to the override signal. The override signal can include instructions that increase or reduce the intensity of the LED lights 64 in such a way to bring the current power consumption of the LED lights 64 within the target power consumption range. As such, the second control module 74 can cooperate with the first control module 70 to facilitate continuous adjustment of the driver signal to maintain the operation of the LED lights 64 within the target power consumption range. If the LED lights 64 are unable to be operated within the target power consumption range (e.g., due to an internal fault or component failure), an alarm can be generated that notifies a user that a failure condition has occurred and the light fixture 20 can be shut down. It is to be appreciated that, although the target power consumption range is described as being calculated onboard the second control module 74, the target power consumption range can alternatively be calculated by a remote source, such as the first control module 70 or the remote controller, and transmitted to the second control module 74 for comparison with the current power consumption of the LED lights 64.

It is to be appreciated that the first and second control modules 70, 74 can be electrically isolated enough from each other such that any critical faults that might occur on the power feedback circuit 77 (e.g., due to an overcurrent condition at the LED driver 62) are contained within the second control module 74. As such, when a critical fault occurs that renders the second control module 74 inoperable, the second control module 74 isolates the first control module 70 from the fault to allow the first control module 70 to continue to operate normally (e.g., to communicate with the remote controller and the downstream lights and to continue to control the operation of the LED lights 64). The light fixture 20 can accordingly be more stable and reliable than conventional light fixtures that only use a single control module to control LED lights from more than one signal (e.g., a control signal from a remote controller and a feedback signal that originates from onboard the light fixture).

Still referring to FIG. 4, the light fixture 20 can include a temperature sensor 84 that is in signal communication with the first control module 70 via a signal line 86. The temperature sensor 84 can be configured to detect an operating temperature of one or more of the LED driver 62 and the LED lights 64 that is transmitted to the first control module 70 via the signal line 86. In one embodiment, the temperature sensor 84 can be attached to the light support portion 30 of the housing 22 (FIG. 1) and can comprise one or more of a thermocouple, a resistance temperature detector, a thermistor, or a semiconductor based integrated circuit.

The first control module 70 can be configured to compare the detected operation temperature to a threshold temperature value. The threshold temperature value can be understood to be a maximum operating temperature for the LED driver 62 and/or the LED lights 64 and can be preset during manufacturing or by a user during programming of the light fixture 20. During operation of the light fixture 20, the first control module 70 can determine the current temperature of the LED driver 62 and/or the LED lights 64 from the temperature sensor 84 and can compare the current temperature to the threshold temperature. If the current temperature is above the threshold temperature, the first control module 70 can adjust the driver signal to reduce the intensity of the LED lights 64 until the current temperature is below the threshold temperature. If the LED lights 64 are unable to be operated below the threshold temperature, (e.g., due to an internal fault or component failure), an alarm can be generated that notifies a user that a failure condition has occurred and the light fixture 20 can be shut down. It is to be appreciated, that in an alternative embodiment, the temperature sensor can be in signal communication with the second control module 74. In such an embodiment, the second control module 74 can compare the detected operation temperature to a threshold temperature value and can provide alternative operating instructions to the first control module 70 via the override signal to control the LED lights 64 accordingly.

Still referring to FIG. 4, the LED driver 62 can include a transformer module 88 that is configured to transform the AC power from the power input 60 into auxiliary DC power for powering the first control module 70 and the second control module 74. In one embodiment, the transformer module 88 can be configured to generate a single voltage (e.g., 12 VDC). In another embodiment, the transformer module 88 can be configured to generate different DC voltages (e.g., 5 VDC, 12 VDC, or 15 VDC) for powering different components of the controller 58. The DC power that is routed from the transformer module 88 to the second control module 74 can be routed through a DC/DC converter 90 that steps down the voltage provided to the second control module 74 (e.g., from 12 VDC to 5 VDC).

A dimmer switch 92 can be selectively plugged into an input port 94 on the light fixture 20. When the dimmer switch 92 is plugged into the input port 94, the dimmer switch 92 can override the driver signal from the remote controller and can allow for manual control of the intensity (e.g., the dimming) of the LED lights 64. In one embodiment, the dimmer switch 92 can comprise a rheostat. When the dimmer switch 92 is not plugged into the input port 94, the controller 58 can control the intensity of the LED lights 64 from the driver signal.

It is to be appreciated that although the control signal from the remote controller is described as being configured to control dimming of the light fixture 20, the control signal can additionally or alternatively control any of a variety of suitable alternative operating characteristics of the light fixture 20 such as, for example, scheduling or color mixing.

Figure 5:
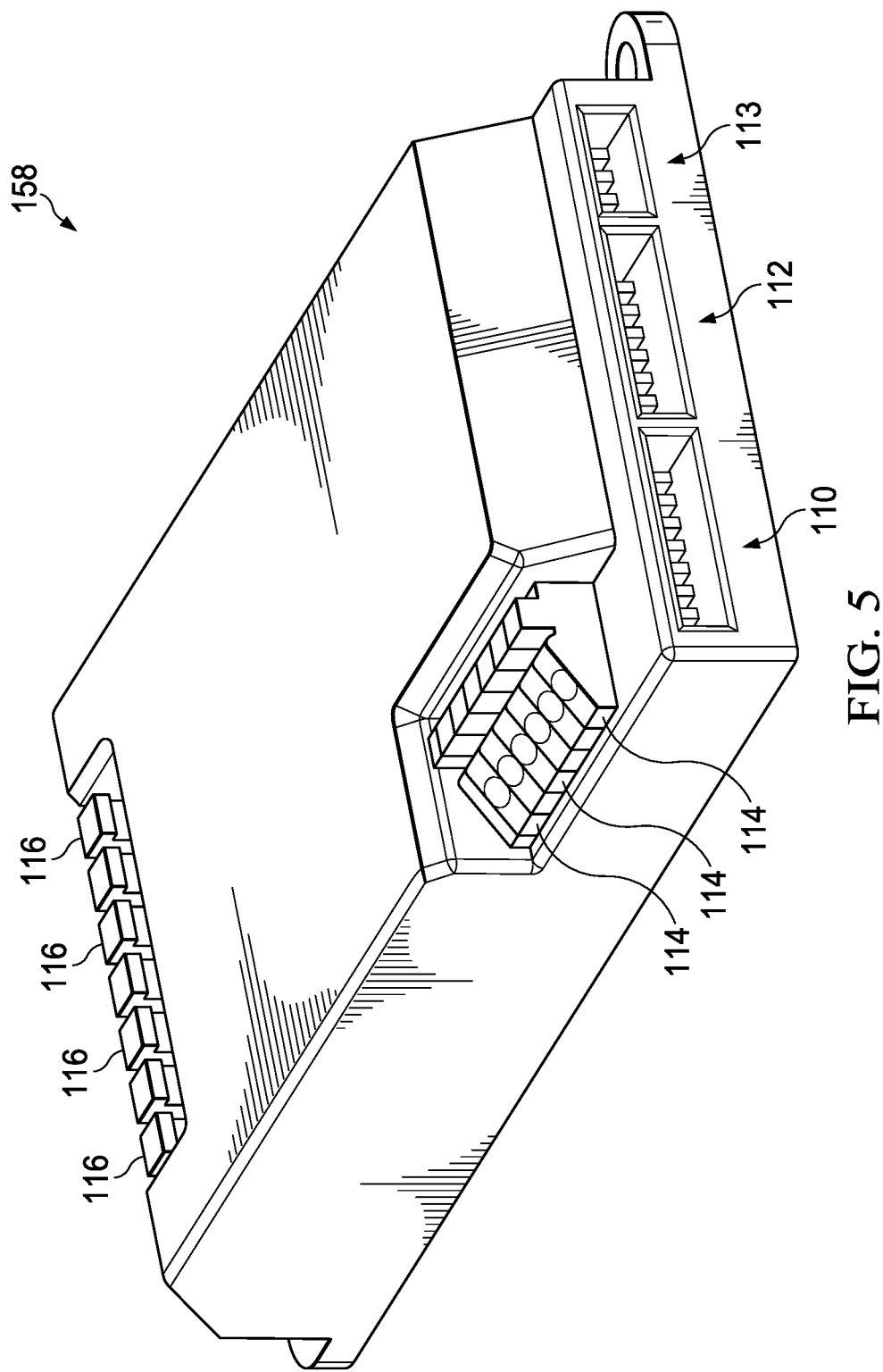
FIG. 5 is an isometric view depicting a controller for a light fixture in accordance with another embodiment.

An alternative embodiment of a controller 158 is illustrated in FIG. 5 that can be similar to, or the same in many respects as, the controller 58 of FIGS. 3 and 4. However, the controller 158 can include an input port 110 and an output port 112 that are associated with a communication input (e.g., 66 in FIG. 4) and a communication output (e.g., 68 in FIG. 4). Input and output communication cables (not shown), such as, for example, a pair of CAT 6e cables, can be plugged into the input port 110 and the output port 112, respectively, to facilitate bidirectional communication of the controller 158 with the remote controller and other light fixtures. The controller 158 can also include a dimmer port 113 for receiving a dimmer switch (e.g., 92).

The controller 158 can also include a first plurality of terminal blocks 114 and a second plurality of terminal blocks 116. The first plurality of terminal blocks 114 facilitate releasable electrical connection of a voltage source, a signal line (e.g., 72), and a temperature sensor (e.g., 84) to the controller 158. The second plurality of terminal blocks 116 can facilitate releasable electrical coupling of voltage feedback lines (e.g., 78) and current feedback lines (e.g., 80) from three different LED drivers (e.g., 62) that power three different sets of LED lights (e.g., 64).

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A light fixture for an indoor grow facility, the light fixture comprising:
   a communication input configured to receive a control signal from a remote controller;
   a communication output configured to relay the control signal from the remote controller to a downstream light fixture;
   a plurality of LED lights;
   an LED driver electrically coupled with the plurality of LED lights;
   a first control module in signal communication with the communication input, the communication output, and the LED driver and configured to transmit a driver signal to the LED driver that controls operation of the plurality of LED lights;
   a second control module in signal communication with the first control module; and
   a feedback circuit in signal communication with the second control module and the LED driver, wherein:
      the LED driver transmits a feedback signal to the second control module via the feedback circuit;
      the second control module transmits an override signal to the first control module in response to the feedback signal;
      the first control module selectively controls the operation of the plurality of LED lights, via the driver signal, from either the control signal or the override signal according to the feedback signal from the second control module;
      the feedback signal comprises a power consumption feedback signal that indicates a current power consumption of the plurality of LED lights;
      the second control module is configured to calculate a threshold power consumption value for the plurality of LED lights based upon the control signal;
      when the current power consumption of the plurality of LED lights is beneath the threshold power consumption value, the first control module controls the operation of the plurality of LED lights, via the driver signal, according to the control signal; and
      when the current power consumption of the plurality of LED lights exceeds the threshold power consumption value, the first control module controls the operation of the plurality of LED lights, via the driver signal, according to the override signal.

2. The light fixture of claim 1 wherein the first control module and the second control module cooperate to facilitate continuous adjustment of the driver signal to maintain the operation of the plurality of LED lights beneath the threshold power consumption value.

3. The light fixture of claim 1 wherein:
   the feedback circuit comprises a voltage feedback line and a current feedback line that cooperate to indicate the current power consumption of the plurality of LED lights;
   the LED driver is configured to transmit a voltage feedback signal and a current feedback signal to the second control module via the voltage feedback line and the current feedback line, respectively; and
   the voltage feedback signal and the current feedback signal indicate a current operating voltage and a current operating current, respectively, of the plurality of LED lights.

4. The light fixture of claim 1 further comprising a temperature sensor that is configured to detect an operating temperature of one or more of the LED driver and the plurality of LED lights and facilitate control of the operation of the plurality of LED lights based upon the operating temperature.

5. The light fixture of claim 4 wherein:
   the temperature sensor is in signal communication with the first control module;
   the first control module is configured to compare the operating temperature to a threshold temperature value; and
   when the operating temperature is above the threshold temperature value, the first control module reduces the power consumption of the plurality of LED lights via the driver signal.

6. A light fixture for an indoor grow facility, the light fixture comprising:
- a communication input configured to receive a control signal from a remote controller;
- a communication output configured to relay the control signal from the remote controller to a downstream light fixture;
- a plurality of LED lights;
- an LED driver electrically coupled with the plurality of LED lights;
- a first control module in signal communication with the communication input, the communication output, and the LED driver and configured to transmit a driver signal to the LED driver that controls operation of the plurality of LED lights;
- a second control module in signal communication with the first control module; and
- a feedback circuit in signal communication with the second control module and the LED driver, wherein:
  - the LED driver transmits a feedback signal to the second control module via the feedback circuit;
  - the second control module transmits an override signal to the first control module in response to the feedback signal;
  - the first control module selectively controls the operation of the plurality of LED lights, via the driver signal, from either the control signal or the override signal according to the feedback signal from the second control module;
  - the feedback signal comprises a power consumption feedback signal that indicates a current power consumption of the plurality of LED lights;
  - the second control module is configured to calculate a target power consumption range for the plurality of LED lights based upon the control signal;
  - when the current power consumption of the plurality of LED lights is within the target power consumption range, the first control module controls the operation of the plurality of LED lights, via the driver signal, according to the control signal; and
  - when the current power consumption of the plurality of LED lights is outside of the target power consumption range, the first control module controls the operation of the plurality of LED lights, via the driver signal, according to the override signal.

7. The light fixture of claim 6 wherein the first control module and the second control module cooperate to facilitate continuous adjustment of the driver signal to maintain the operation of the plurality of LED lights within the target power consumption range.

8. The light fixture of claim 6 wherein:
- the feedback circuit comprises a voltage feedback line and a current feedback line that cooperate to indicate the current power consumption of the plurality of LED lights;
- the LED driver is configured to transmit a voltage feedback signal and a current feedback signal to the second control module via the voltage feedback line and the current feedback line, respectively; and
- the voltage feedback signal and the current feedback signal indicate a current operating voltage and a current operating current, respectively, of the plurality of LED lights.

9. The light fixture of claim 6 further comprising a temperature sensor that is configured to detect an operating temperature of one or more of the LED driver and the plurality of LED lights and facilitate control of the operation of the plurality of LED lights based upon the operating temperature.

10. The light fixture of claim 9 wherein:
- the temperature sensor is in signal communication with the first control module;
- the first control module is configured to compare the operating temperature to a threshold temperature value; and
- when the operating temperature is above the threshold temperature value, the first control module reduces the power consumption of the plurality of LED lights via the driver signal.

11. A light fixture for an indoor grow facility, the light fixture comprising:
- a communication input configured to receive a control signal from a remote controller;
- a communication output configured to relay the control signal from the remote controller to a downstream light fixture;
- a plurality of LED lights;
- an LED driver electrically coupled with the plurality of LED lights;
- a first control module in signal communication with the communication input, the communication output, and the LED driver and configured to transmit a driver signal to the LED driver that controls operation of the plurality of LED lights;
- a second control module in signal communication with the first control module; and
- a feedback circuit in signal communication with the second control module and the LED driver, wherein:
  - the LED driver transmits a power consumption feedback signal to the second control module via the feedback circuit that indicates a current power consumption of the plurality of LED lights;
  - the second control module transmits an override signal to the first control module in response to the power consumption feedback signal;
  - the second control module is configured to calculate a threshold power consumption value and a target power consumption range for the plurality of LED lights based upon the control signal;
  - when the current power consumption of the plurality of LED lights is either beneath the threshold power consumption value or within the target power consumption range, the first control module controls the operation of the plurality of LED lights, via the driver signal, according to the control signal; and
  - when the current power consumption of the plurality of LED lights either exceeds the threshold power consumption value or is outside of the target power consumption range, the first control module controls the operation of the plurality of LED lights, via the driver signal, according to the override signal.

12. The light fixture of claim 11 wherein:
- the feedback circuit comprises a voltage feedback line and a current feedback line that cooperate to indicate the current power consumption of the plurality of LED lights;
- the LED driver is configured to transmit a voltage feedback signal and a current feedback signal to the second control module via the voltage feedback line and the current feedback line, respectively; and the voltage feedback signal and the current feedback signal indicating a current operating voltage and a current operating current, respectively, of the plurality of LED lights.

13. The light fixture of claim 11 further comprising a temperature sensor that is configured to detect an operating temperature of one or more of the LED driver and the plurality of LED lights and facilitate control of the operation of the plurality of LED lights based upon the operating temperature.

14. The light fixture of claim 13 wherein:
the temperature sensor is in signal communication with the first control module;
the first control module is configured to compare the operating temperature to a threshold temperature value; and
when the operating temperature is above the threshold temperature valve, the first control module reduces the current power consumption of the plurality of LED lights via the driver signal.

15. A light fixture for an indoor grow facility, the light fixture comprising:
a communication input configured to receive a control signal from a remote controller;
a communication output configured to relay the control signal from the remote controller to a downstream light fixture;
a plurality of LED lights;
an LED driver electrically coupled with the plurality of LED lights;
a first control module in signal communication with the communication input, the communication output, and the LED driver and configured to transmit a driver signal to the LED driver that controls operation of the plurality of LED lights;
a second control module in signal communication with the first control module; and
a feedback circuit in signal communication with the second control module and the LED driver;
a temperature sensor configured to detect an operating temperature of one or more of the LED driver and the plurality of LED lights, wherein:
the LED driver transmits a power consumption feedback signal to the second control module via the feedback circuit that indicates a current power consumption of the plurality of LED lights;
the second control module transmits an override signal to the first control module in response to the power consumption feedback signal;
the second control module is configured to calculate a threshold power consumption value for the plurality of LED lights based upon the control signal;
when the current power consumption of the plurality of LED lights is beneath the threshold power consumption value, the first control module controls the operation of the plurality of LED lights, via the driver signal, according to the control signal;
when the current power consumption of the plurality of LED lights exceeds the threshold power consumption value, the first control module controls the operation of the plurality of LED lights, via the driver signal, according to the override signal; and
the temperature sensor facilitates control of the operation of the plurality of LED lights based upon the operating temperature.

16. The light fixture of claim 15 wherein:
the temperature sensor is in signal communication with the first control module;
the first control module is configured to compare the operating temperature to a threshold temperature value; and
when the operating temperature is above the threshold temperature value, the first control module reduces the current power consumption of the plurality of LED lights via the driver signal.

17. The light fixture of claim 16 wherein the first control module and the second control module cooperate to facilitate continuous adjustment of the driver signal to maintain the operation of the plurality of LED lights beneath the threshold power consumption value.

18. The light fixture of claim 17 wherein:
the feedback circuit comprises a voltage feedback line and a current feedback line that cooperate to indicate the current power consumption of the plurality of LED lights;
the LED driver is configured to transmit a voltage feedback signal and a current feedback signal to the second control module via the voltage feedback line and the current feedback line, respectively; and
the voltage feedback signal and the current feedback signal indicating a current operating voltage and a current operating current, respectively, of the plurality of LED lights.

19. The light fixture of claim 18 wherein the current feedback signal is routed through a translation module that facilitates translation of the current feedback signal into a suitable format for the second control module.

* * * * *